（12）United States Patent
Lim

(10) Patent No.: US 11,676,414 B2
(45) Date of Patent: Jun. 13, 2023

(54) LIQUID CRYSTAL PROTECTION FILM CAPABLE OF ULTRASONIC FINGERPRINT RECOGNITION

(71) Applicant: REALOOK & COMPANY corp., Yongin-si (KR)

(72) Inventor: Nam Il Lim, Suwon-si (KR)

(73) Assignee: REALOOK & COMPANY CORP., Yongin-si (KR)

( * ) Notice: Subject to any disclaimer, the term of this patent is extended or adjusted under 35 U.S.C. 154(b) by 0 days.

(21) Appl. No.: 17/254,341

(22) PCT Filed: Nov. 21, 2019

(86) PCT No.: PCT/KR2019/016062
§ 371 (c)(1),
(2) Date: Dec. 21, 2020

(87) PCT Pub. No.: WO2021/060620
PCT Pub. Date: Apr. 1, 2021

(65) Prior Publication Data
US 2021/0271840 A1  Sep. 2, 2021

(30) Foreign Application Priority Data
Sep. 26, 2019  (KR) .................. 10-2019-0118678

(51) Int. Cl.
*G06V 40/13* (2022.01)
*G02F 1/1333* (2006.01)

(52) U.S. Cl.
CPC ...... *G06V 40/1306* (2022.01); *G02F 1/13338* (2013.01)

(58) Field of Classification Search
CPC .......... G06K 9/00006–00093; G06K 9/00–82; C09D 201/00–10; C09J 7/00–50;
(Continued)

(56) References Cited

U.S. PATENT DOCUMENTS

2015/0346408 A1* 12/2015 Mizutani ............. H01L 51/5281
428/41.5
2019/0087630 A1* 3/2019 Seo ..................... G06K 9/00053
(Continued)

FOREIGN PATENT DOCUMENTS

KR  10-2014-0000145 A  1/2014
KR  10-2017-0142765 A  12/2017
(Continued)

OTHER PUBLICATIONS

Lacefield, Diagnostic Radiology Physics: A Handbook for Teachers and Student, 2014, International Atomic Energy Agency, p. 293, ISBN 978-92-0-131010-1 (Year: 2014).*

*Primary Examiner* — Amr A Awad
*Assistant Examiner* — Aaron Midkiff
(74) *Attorney, Agent, or Firm* — Bridgeway IP Law Group, PLLC; Jihun Kim

(57) ABSTRACT

A liquid crystal protection film is capable of ultrasonic fingerprint recognition in order to improve ultrasonic fingerprint recognition performance. The liquid crystal protection film includes a liquid crystal protection film part attached to an upper portion of a liquid crystal so as to protect the liquid crystal. The liquid crystal protection film part includes: a first layer attached to the upper portion of the liquid crystal; a second layer formed on an upper portion of the first layer; and a liquid crystal adhesive layer formed under the first layer and provided so that the liquid crystal adheres to the first layer.

7 Claims, 4 Drawing Sheets

(58) Field of Classification Search
CPC ............ C09J 2301/00–504; B32B 7/12; B32B 37/1284; B32B 2457/00–208; B32B 7/00–14; B32B 27/00–42; G02F 1/13338; G02F 1/1335; G02F 2201/50; G06F 3/043–0436; G06F 3/00–167; G06F 21/32; G06F 3/0412; G06V 40/13–1329; G06V 40/1306
See application file for complete search history.

(56) References Cited

U.S. PATENT DOCUMENTS

| | | | | |
|---|---|---|---|---|
| 2019/0300425 | A1* | 10/2019 | Ikadai | G06F 1/181 |
| 2019/0384960 | A1* | 12/2019 | Kwon | H01L 27/1214 |
| 2020/0091458 | A1* | 3/2020 | Oh | G06F 1/1637 |
| 2020/0125815 | A1* | 4/2020 | Lu | G06V 40/1306 |
| 2021/0004555 | A1* | 1/2021 | Panchawagh | G06F 3/0414 |
| 2021/0350109 | A1* | 11/2021 | Jin | G06V 40/1329 |

FOREIGN PATENT DOCUMENTS

| | | |
|---|---|---|
| KR | 10-2018-0062350 A | 6/2018 |
| KR | 10-2019-0030907 A | 3/2019 |
| KR | 10-2019-0081294 A | 7/2019 |
| KR | 10-2019-0108289 A | 9/2019 |
| KR | 10-2020-0034261 A | 3/2020 |

\* cited by examiner

LIQUID CRYSTAL PROTECTION FILM CAPABLE OF ULTRASONIC FINGERPRINT RECOGNITION

TECHNICAL FIELD

The disclosure relates to a liquid crystal protection film capable of ultrasonic fingerprint recognition, and more particularly, to a liquid crystal protection film capable of ultrasonic fingerprint recognition in order to improve ultrasonic fingerprint recognition performance.

BACKGROUND ART

Fingerprint recognition systems for smart devices include optical fingerprint recognition systems, electrostatic fingerprint recognition systems, and ultrasonic fingerprint recognition systems.

Optical fingerprint recognition systems recognize fingerprints by collecting fingerprint ridges and valleys according to the shade of light emitted from a light source and then reflected back, and have excellent durability.

However, optical fingerprint recognition systems have inferior accuracy in fingerprint recognition.

Electrostatic fingerprint recognition systems recognize fingerprints by measuring a difference in capacitance according to fingerprint ridges and valleys, and have excellent accuracy in fingerprint recognition.

However, electrostatic fingerprint recognition systems have low durability and low yield.

Ultrasonic fingerprint recognition systems recognize fingerprints by scanning fine features of skin epidermal layers using ultrasonic waves, and have excellent accuracy and durability in fingerprint recognition, but are expensive.

Recently, demand for ultrasonic fingerprint recognition systems is increasing in order to meet both accuracy and durability in fingerprint recognition.

However, ultrasonic fingerprint recognition systems have a problem in that, when a liquid crystal protection film is attached to liquid crystal, the liquid crystal protection film interferes with the transmission of ultrasonic waves and thus lowers a fingerprint recognition rate.

Therefore, there is a need for liquid crystal protection films capable of increasing a fingerprint recognition rate even when attached to liquid crystal.

CITATION OF LITERATURE

Korean Patent Laid-Open Publication No. 10-2019-0081294

DESCRIPTION OF EMBODIMENTS

Technical Problem

The disclosure has been made in an effort to solve the above problems, and an object of the disclosure is to provide a liquid crystal protection film capable of ultrasonic fingerprint recognition in order to improve ultrasonic fingerprint recognition performance.

The technical problems to be solved by the disclosure are not limited to those described above, and other technical problems not described herein will be clearly understood by those of ordinary skill in the art from the following description.

Technical Solution to Problem

In order to achieve the above object, a liquid crystal protection film capable of ultrasonic fingerprint recognition includes a liquid crystal protection film part attached to an upper portion of a liquid crystal so as to protect the liquid crystal, wherein the liquid crystal protection film part includes: a first layer attached to the upper portion of the liquid crystal; a second layer formed on an upper portion of the first layer; and a liquid crystal adhesive layer formed under the first layer and provided so that the liquid crystal adheres to the first layer.

In an embodiment of the disclosure, the first layer may be provided as a base layer including at least one of polyethylene terephthalate (PET), polyethylene (PE), polycarbonate (PC), polypropylene (PP), polymethyl methacrylate (PMMA), and polyurethane (PU).

In an embodiment of the disclosure, the second layer may be formed by thermally curable hard coating or UV hard coating, or may be formed by laminating with the same base layer as that of the first layer by heat or adhesion.

In an embodiment of the disclosure, the liquid crystal adhesive layer may include at least one of a silicone-based adhesive, an acrylic adhesive, and a urethane-based adhesive.

In an embodiment of the disclosure, the liquid crystal adhesive layer may be provided to have an impedance within a preset difference from an impedance of the first layer.

In an embodiment of the disclosure, a thickness or a medium of the liquid crystal adhesive layer may be controlled so that an ultrasonic wave passing through the liquid crystal adhesive layer has a wavelength within a preset difference from a wavelength of an ultrasonic wave passing through the first layer.

In an embodiment of the disclosure, the thickness of the liquid crystal adhesive layer may be controlled so that $\lambda$, which is the wavelength of ultrasonic wave passing through the liquid crystal adhesive layer, becomes a multiple of $\lambda/2$.

In an embodiment of the disclosure, the thickness of the first layer may be controlled so that $\lambda$, which is the wavelength of ultrasonic wave passing through the first layer, becomes a multiple of $\lambda/2$.

In an embodiment of the disclosure, the liquid crystal protection film may further include a cover film part provided in a state of adhering to an upper portion of the liquid crystal protection film part, wherein the cover film part may include: a cover film provided to protect the upper portion of the liquid crystal protection film part; and a cover adhesive layer formed under the cover film and provided so that the cover film adheres to the upper portion of the liquid crystal protection film part.

In an embodiment of the disclosure, the liquid crystal protection film may further include a release film part provided in a state of adhering to a lower portion of the liquid crystal protection film part, wherein the release film part may include: a release film provided to protect a lower adhesive surface of the liquid crystal protection film part; and a release layer formed above the release film so that the release film is attachable to or detachable from the lower portion of the liquid crystal protection film part.

Advantageous Effects of Disclosure

The effects of the disclosure according to the above configuration are that a fingerprint recognition rate by ultrasonic waves is high even when a liquid crystal protection film is attached to liquid crystal.

In particular, according to the disclosure, the impedance difference among a liquid crystal, a first layer, a second layer, and a liquid crystal adhesive layer is controlled so that the fingerprint recognition performance degradation is within 0.35 dB. Thus, a high fingerprint recognition rate may be maintained even when the liquid crystal protection film is attached to the liquid crystal.

The effects of the disclosure are not limited to those described above, and should be understood to include all the effects that can be inferred from the configuration of the invention described in the detailed description or the claims of the disclosure.

BEST MODE

Figure 1:
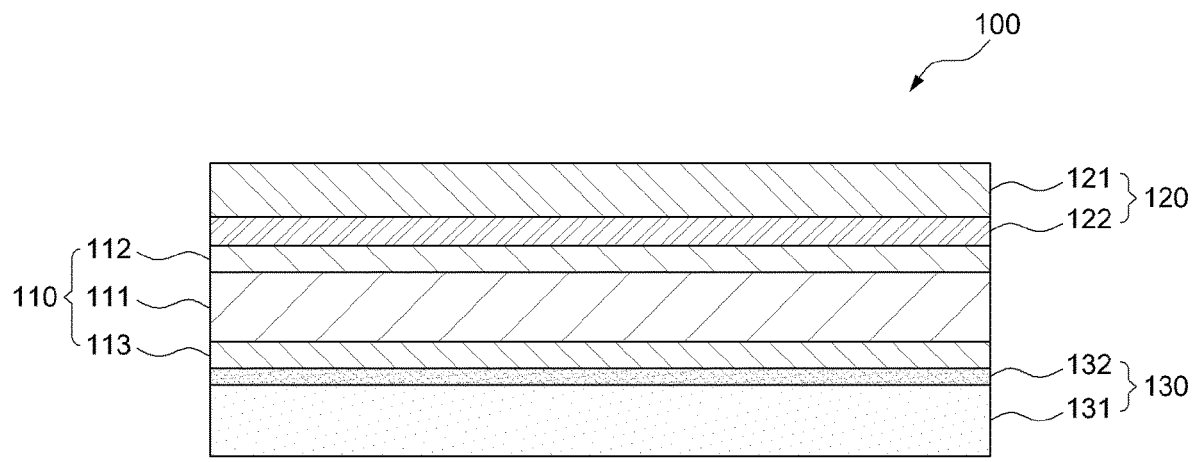
FIG. 1 is a cross-sectional view of a liquid crystal protection film capable of ultrasonic fingerprint recognition, according to an embodiment of the disclosure.

A liquid crystal protection film capable of ultrasonic fingerprint recognition according to the disclosure includes a liquid crystal protection film part attached to an upper portion of a liquid crystal so as to protect the liquid crystal, wherein the liquid crystal protection film part includes: a first layer attached to the upper portion of the liquid crystal; a second layer formed on an upper portion of the first layer; and a liquid crystal adhesive layer formed under the first layer and provided so that the liquid crystal adheres to the first layer.

MODE OF DISCLOSURE

Hereinafter, the disclosure will be described in detail with reference to the accompanying drawings. However, the disclosure may be embodied in many different forms and is not limited to the embodiments of the disclosure described herein. Also, in order to clearly describe the disclosure, parts having no relation to the description are omitted, and like reference numerals are assigned to like elements throughout the specification.

It will be understood that when a region is referred to as being "connected to (contacted with or coupled to)" another region, it may be directly connected to the other region or may be indirectly connected to with intervening regions therebetween. It will be understood that the terms "comprise," "include," or "have" as used herein specify the presence of stated elements, but do not preclude the presence or addition of one or more other elements.

The terms as used herein are only used to describe specific embodiments, and are not intended to limit the disclosure. The singular forms "a," "an," and "the" as used herein are intended to include the plural forms as well unless the context clearly indicates otherwise. The terms "comprises," "comprising," "including," and "having," as used herein are inclusive and therefore specify the presence of stated features, integers, steps, operations, elements, or components, but do not preclude the presence or addition of one or more other features, integers, steps, operations, elements, components, or combinations thereof.

Hereinafter, embodiments of the disclosure will be described in detail with reference to the accompanying drawings.

FIG. 1 is a cross-sectional view of a liquid crystal protection film capable of ultrasonic fingerprint recognition, according to an embodiment of the disclosure.

As illustrated in FIG. 1, a liquid crystal protection film 100 capable of ultrasonic fingerprint recognition includes a liquid crystal protection film part 110, a cover film part 120, and a release film part 130.

The liquid crystal protection film part 110 may be attached to an upper portion of a liquid crystal G of a smart device so as to protect the liquid crystal G.

The liquid crystal protection film part 110 includes a first layer 111, a second layer 112, and a liquid crystal adhesive layer 113.

The first layer 111 is attached to the upper portion of the liquid crystal G so as to protect the liquid crystal G.

The first layer 111 may be provided as a base layer including polyethylene terephthalate (PET), polyethylene (PE), polycarbonate (PC), polypropylene (PP), polymethyl methacrylate (PMMA), or polyurethane (PU) and may be formed to have a thickness of 20 µm to 188 µm.

The second layer 112 may be coated on the first layer 111 and provided so as to improve the durability of the first layer 111.

The second layer 112 may be formed on the first layer 111 by thermally curable hard coating or UV hard coating, and may be formed to have a thickness of 0.1 µm to 20 µm.

The second layer 112 may be continuously provided using the same material as that of the base layer of the first layer 111. In this case, the second layer 112 may be formed by laminating with the same base layer as that of the first layer 111 by heat or adhesion.

The liquid crystal adhesive layer 113 may be formed under the first layer 111, and may be provided so that the liquid crystal G adheres to the first layer 111.

The liquid crystal adhesive layer 133 may include a silicone-based material, an acrylic material, and a urethane-based material, and may be formed to have a thickness of 1 µm to 50 µm.

The liquid crystal adhesive layer 113 prepared as described above may be provided to have an impedance within a preset difference from the impedance of the first layer 111. The impedance refers to acoustic impedance, and the acoustic impedance may be calculated by [Equation 1] below.

$$Z = \rho C = \sqrt{\rho E} \qquad \text{[Equation 1]}$$

Z is acoustic impedance (independent of frequency), p is density, C is ultrasound velocity, and E is volume modulus.

TABLE 1

| | Density proportion | Volume modulus proportion |
|---|---|---|
| Second layer 5 µm | 1.02 | 3.1 |
| First layer 38 µm | 1.4 | 3.0 |
| Liquid crystal adhesive layer 20 µm | 0.97 | 0.3 |

Referring to [Table 1] above, the second layer 112 and the first layer 111 have similar volume modulus and thus have similar impedance, but the liquid crystal adhesive layer 113 has a significant impedance difference from the liquid crystal G, the second layer 112, and the first layer 111 due to the difference in volume modulus.

Due to the impedance difference, whenever the ultrasonic waves pass through the liquid crystal adhesive layer 113, the transmission amount of the ultrasonic wave greatly decreases and the amount of ultrasonic waves reaching the fingerprint decreases, thus greatly lowering a fingerprint recognition rate.

Therefore, the liquid crystal adhesive layer 113 may be provided to have an impedance within a preset difference from the impedance of the first layer 111.

To this end, the thickness of the liquid crystal adhesive layer 113 is controlled so that the wavelength of the ultrasonic wave passing through the liquid crystal adhesive layer 113 has a wavelength within a preset difference from the wavelength of the ultrasonic wave passing through the first layer 111.

In particular, the thickness of the liquid crystal adhesive layer 113 may be controlled so that the wavelength of the ultrasonic wave passing through the liquid crystal adhesive layer 113 becomes a multiple of k. The liquid crystal adhesive layer 113 prepared as described above may be provided to have an impedance within a preset difference from the impedance of the first layer 111.

In addition, the thickness of the first layer 111 is further controlled so that the wavelength of the ultrasonic wave passing through the first layer 111 becomes a multiple of k. Thus, the impedance difference from the liquid crystal adhesive layer 113 may be further decreased.

That is, in the disclosure, the impedance difference among the liquid crystal G, the first layer 111, the second layer 112, and the liquid crystal adhesive layer 113 is controlled so that the decrease in fingerprint recognition performance is within 0.35 dB. Therefore, the fingerprint recognition rate of the liquid crystal protection film 100 capable of ultrasonic fingerprint recognition may be further improved.

Figure 2:
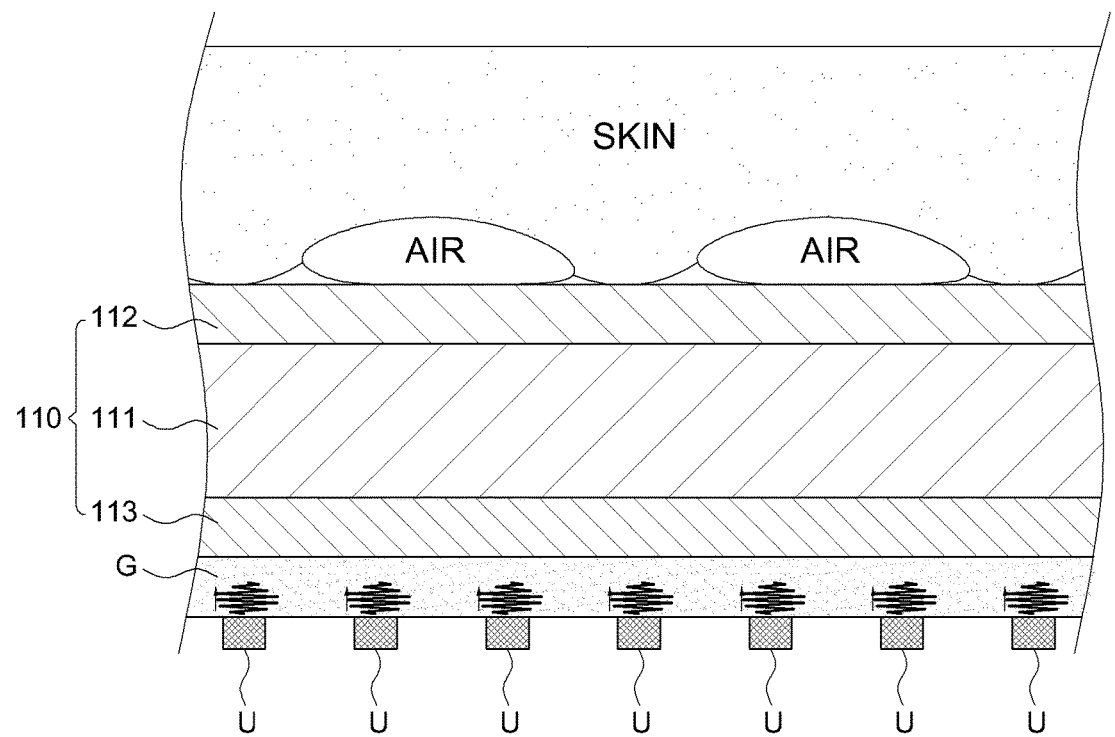
FIGS. 2 to 4 are exemplary diagrams illustrating a change in wavelength according to an impedance difference of a liquid crystal protection film capable of ultrasonic fingerprint recognition, according to an embodiment of the disclosure.
Figure 3:
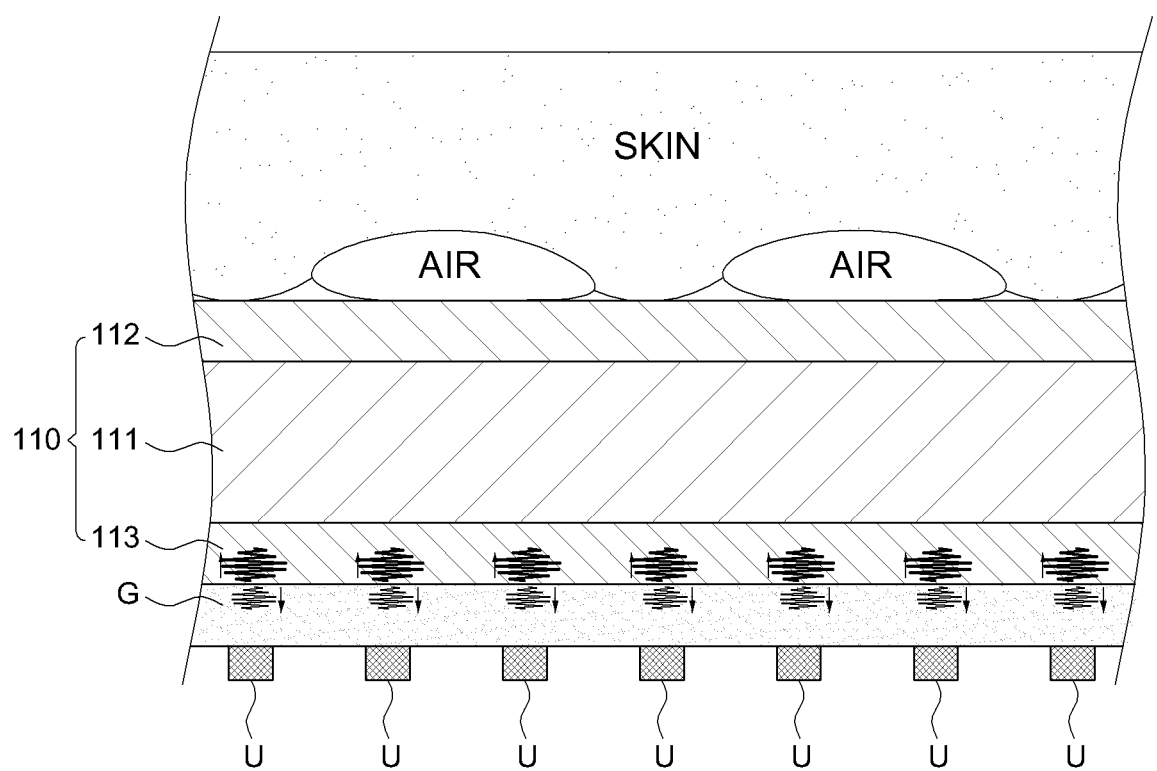
Figure 4:
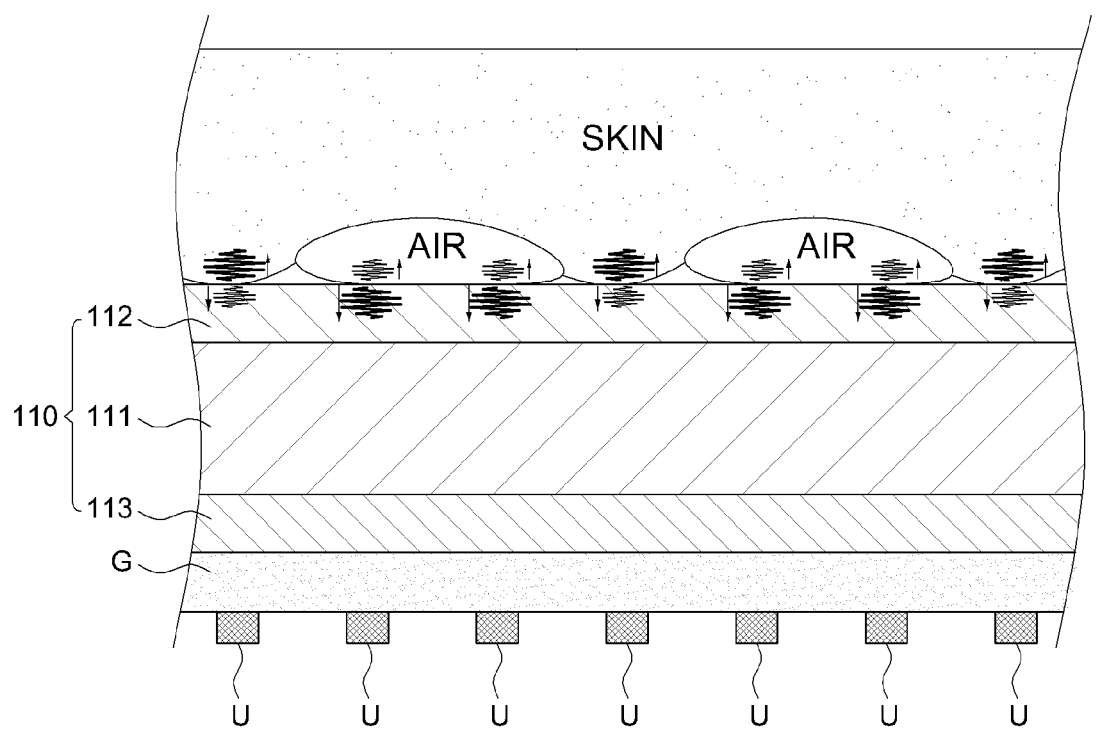

FIGS. 2 to 4 are exemplary diagrams illustrating a change in wavelength according to the impedance difference of the liquid crystal protection film capable of ultrasonic fingerprint recognition, according to an embodiment of the disclosure.

For example, as illustrated in FIG. 2, an ultrasonic module U may irradiate ultrasonic waves toward the upper portion of the liquid crystal G.

As illustrated in FIG. 3, as the irradiated ultrasonic waves enter the liquid crystal adhesive layer 113 having an impedance different from that of the liquid crystal G, some ultrasonic waves may be reflected due to the impedance difference.

In this case, when the impedance difference between the liquid crystal adhesive layer 113 and the liquid crystal G is greater than a preset difference, most of the ultrasonic waves are reflected and the amount of ultrasonic waves reaching the fingerprint is small. Thus, the ultrasonic recognition rate may be lowered.

However, since the thickness of the liquid crystal adhesive layer 113 according to the disclosure is controlled so that the liquid crystal adhesive layer 113 has a wavelength at which the impedance difference from the liquid crystal G is within a preset difference, the amount of ultrasonic waves reflected from the interface is small.

That is, in the disclosure, since the impedances of the liquid crystal G, the liquid crystal adhesive layer 113, the first layer 111, and the second layer 112 are similar to each other, the ultrasonic waves irradiated from the ultrasonic module U may relatively completely reach the fingerprint of the finger.

As illustrated in FIG. 4, most of the ultrasonic waves touching the fingerprint of the finger may be reflected due to the impedance difference between the second layer 112 and an air layer formed between the skin layers of the finger. That is, the fingerprint may be accurately sensed by recognizing ultrasonic waves reflected from the air layer formed between the skin layers of the finger according to the shape of the fingerprint.

According to the disclosure, by minimizing impedance mismatching among the liquid crystal G, the liquid crystal adhesive layer 113, the first layer 111, and the second layer 112, a decrease in fingerprint recognition performance may be made to be 0.35 dB or less even in a state in which the protection film part 110 is attached to the liquid crystal G. That is, ultrasonic recognition with a performance level equivalent to that of a fingerprint sensor is made possible.

The cover film part 120 is provided in a state of adhering to the upper portion of the liquid crystal protection film part 110, and may include a cover film 121 and a cover adhesive layer 122.

The cover film 121 may be provided to protect the upper portion of the second layer 112 of the liquid crystal protection film part 110.

The cover film 121 may include polyethylene terephthalate (PET), polyethylene (PE), polycarbonate (PC), polypropylene (PP), polymethyl methacrylate (PMMA), or polyurethane (PU), and may be formed to have a thickness of 12 μm to 150 μm.

The cover adhesive layer 122 may be formed under the cover film 121, and may include a material having adhesive strength so that the cover film 121 may adhere to the upper portion of the liquid crystal protection film part 110.

The cover adhesive layer 122 may include a silicone-based adhesive material, an acrylic adhesive material, and a urethane-based adhesive material, and may be formed to have a thickness of 0.1 μm to 50 μm.

The release film part 130 may be provided in a state of adhering to the lower portion of the liquid crystal protection film part 110, and may include a release film 131 and a release layer 132.

The release film 131 may be provided to protect the lower adhesive surface of the liquid crystal protection film part 110.

The release film 131 may include polyethylene terephthalate (PET), polyethylene (PE), polycarbonate (PC), polypropylene (PP), polymethyl methacrylate (PMMA), or polyurethane (PU), and may be formed to have a thickness of 12 μm to 150 μm.

The release layer 132 may be formed above the upper portion of the release film 131 so that the release film 131 is easily attachable to or detachable from the liquid crystal protection film part 110.

The release layer 132 may include a fluorine release material, and may be formed to have a thickness of 0.1 μm to 5 μm.

The release film part 130 prepared as described above may protect the liquid crystal adhesive layer 113 in a state of being attached to the liquid crystal adhesive layer 113, and may be removed when the liquid crystal adhesive layer 113 is attached to the liquid crystal G.

In addition, the cover film part 120 is removed after the liquid crystal protection film part 110 is attached to the liquid crystal G. Therefore, the cover film part 120 may be provided to protect the liquid crystal protection film part 110 until before the liquid crystal protection film part 110 is attached to the liquid crystal G.

According to the disclosure provided as described above, even when the liquid crystal protection film part 110 is attached to the liquid crystal G, the decrease in ultrasonic waves is within 0.35 dB, thereby securing a high fingerprint recognition rate.

Figure 5:
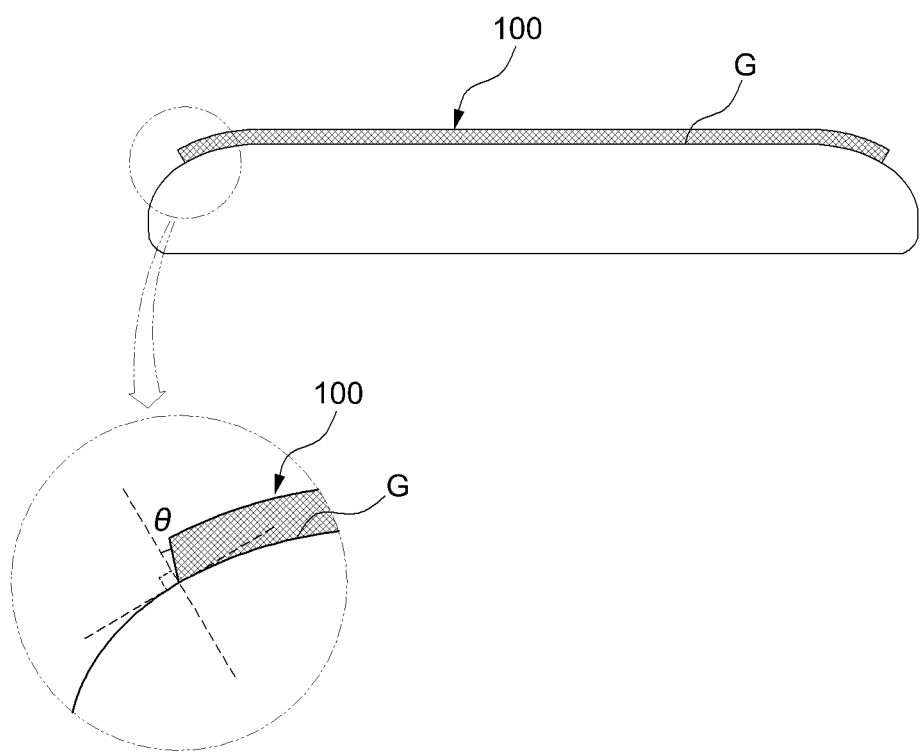
FIG. 5 is an exemplary diagram illustrating a side surface of a liquid crystal protection film capable of ultrasonic fingerprint recognition, which is attached to a curved liquid crystal, according to an embodiment of the disclosure.

FIG. 5 is an exemplary diagram illustrating a side surface of a liquid crystal protection film capable of ultrasonic fingerprint recognition, which is attached to a curved liquid crystal, according to an embodiment of the disclosure.

Meanwhile, referring to FIG. 5, the main principle of forming the liquid crystal protection film 100 capable of ultrasonic fingerprint recognition is implemented through "micro-brownian motion" in polymer engineering. When the temperature of the liquid crystal protection film 100 capable of ultrasonic fingerprint recognition is raised, polymer materials in each constituent layer sequentially reach Tg (glass transition temperature) and Tm (melting temperature), which are temperatures at which molecules start to move with the activity of the molecules by temperature.

For each constituent layer of the liquid crystal protection film 100 capable of ultrasonic fingerprint recognition, the physical properties of the film layer are designed and manufactured so that a temperature range in which Tg (glass transition temperature) crosses evenly is formed between Tg (glass transition temperature) and Tm (melting temperature). Then, a temperature is measured for each constituent layer in an actual forming machine as necessary, so that actual molding is performed in the temperature range in which Tg (glass transition temperature) crosses.

In this case, the liquid crystal protection film 100 capable of ultrasonic fingerprint recognition is deformed for each layer with respect to the magnitude of pressure applied thereto or the direction in which pressure is applied. A peripheral area including the vertical, horizontal, left, and right curved surfaces of the liquid crystal protection film 100 capable of ultrasonic fingerprint recognition may be provided to have an inclination value of a modified slope of −45 degrees to +45 degrees based on the right angle to the surface portion of the liquid crystal G, which is the tempered glass to be actually attached after the forming process.

In addition, the curvature of the curved portion of the formed (bent and pressurized) liquid crystal protection film 100 may be equal to or relatively greater than the curvature of the curved portion of the liquid crystal. Therefore, it is preferable that the curved portion of the liquid crystal protection film 100 formed with the curved surface is formed in a shape that is relatively more curved than the curved portion of the liquid crystal. Since the formed curved portion of the forming film has a curvature designed by elasticity, a springback phenomenon may be prevented and the occurrence of thermal wrinkles or molding damage may be prevented.

Furthermore, when the liquid crystal protection film 100 capable of ultrasonic fingerprint recognition according to the disclosure is directly attached to the liquid crystal, it is unnecessary to additionally apply a separate adhesive or the like onto the surface of the liquid crystal according to the curvature difference of the curved surfaces of the liquid crystal and the liquid crystal protection film 100. Sufficient adhesive strength may be provided only by the adhesive strength of the liquid crystal adhesive layer 113 included in the liquid crystal protection film 100 according to the disclosure. Therefore, since it is possible to prevent the adhesive or the like from leaking out after the liquid crystal protection film 100 is attached to the curved liquid crystal, and each film layer and the liquid crystal adhesive layer 113 are curved along the curved surface of the liquid crystal protection film 100, it is possible to maintain very clean contact surface, to which dust or foreign matter is not attached, while the liquid crystal protection film 100 is attached to the liquid crystal.

The foregoing description of the disclosure is for illustration and those of ordinary skill in the art will appreciate that modifications may be easily made to other specific forms without changing the technical spirit or essential features of the disclosure. Therefore, it will be understood that the embodiments of the disclosure described above are illustrative in all aspects and not restrictive. For example, each element described as a single type may be implemented in a distributed manner. Similarly, elements described as distributed may be implemented in a combined form.

The scope of the disclosure is indicated by the claims, and it should be construed that all changes or modifications derived from the meaning and scope of the claims and equivalent concepts thereof fall within the scope of the disclosure.

DESCRIPTION OF SYMBOLS

100: liquid crystal protection film capable of ultrasonic fingerprint recognition
110: liquid crystal protection film part
111: first layer
112: second layer
113: liquid crystal adhesive layer
120: cover film part
121: cover film
122: cover adhesive layer
130: release film part
131: release film
132: release layer
G: liquid crystal
U: ultrasonic module

The invention claimed is:

1. A liquid crystal protection film capable of ultrasonic fingerprint recognition, the liquid crystal protection film comprising:
 a liquid crystal protection film part configured to be attached to an upper portion of a liquid crystal of a smart device including an ultrasonic fingerprint recognition sensor, so as to protect the liquid crystal; and
 a cover film part configured to adhere to an upper portion of the liquid crystal protection film part,
 wherein the liquid crystal protection film part comprises:
 a first layer attached to the upper portion of the liquid crystal;
 a second layer formed on an upper portion of the first layer and having a thickness of 0.1 μm to 20 μm to be directly coated on the first layer by thermally curable hard coating or UV hard coating; and
 a liquid crystal adhesive layer formed under the first layer to allow the liquid crystal to adhere to the first layer and having a thickness of 1 μm to 50 μm, and wherein the cover film part comprises:
 a cover film configured to protect the upper portion of the liquid crystal protection film part; and
 a cover adhesive layer formed under the cover film to allow the cover film to adhere to the upper portion of the liquid crystal protection film part,
 wherein a thickness of the cover film is 12 μm to 150 μm,
 wherein a thickness of the cover adhesive layer is 0.1 μm to 50 μm,
 wherein the liquid crystal adhesive layer is configured to have an impedance within a preset difference from an impedance of the first layer by controlling an ultrasonic wave passing through the liquid crystal adhesive layer to have a wavelength within a preset difference from a wavelength of an ultrasonic wave passing through the first layer, wherein a difference in impedance among the liquid crystal, the first layer, the second layer, and the liquid crystal adhesive layer is controlled so that performance degradation of the fingerprint recognition is within 0.35 dB, wherein the impedance is an acoustic impedance calculated by an equation below:

$$Z=\rho C=\sqrt{\rho E},$$

wherein Z is the acoustic impedance, p is a density, C is an ultrasound velocity, and E is a volume modulus.

2. The liquid crystal protection film of claim 1, wherein the first layer includes at least one of polyethylene terephthalate (PET), polyethylene (PE), polycarbonate (PC), polypropylene (PP), polymethyl methacrylate (PMMA), and polyurethane (PU).

3. The liquid crystal protection film of claim 2, wherein the liquid crystal adhesive layer includes at least one of a silicone-based adhesive, an acrylic adhesive, and a urethane-based adhesive.

4. The liquid crystal protection film of claim 1, wherein the thickness of the liquid crystal adhesive layer is controlled so that $\lambda$, which is the wavelength of the ultrasonic wave passing through the liquid crystal adhesive layer, becomes a multiple of $\lambda/2$.

5. The liquid crystal protection film of claim 1, wherein a thickness of the first layer is controlled so that $\lambda$, which is the wavelength of the ultrasonic wave passing through the first layer, becomes a multiple of $\lambda/2$.

6. The liquid crystal protection film of claim 1, further comprising a release film part configured to adhere to a lower portion of the liquid crystal protection film part, wherein the release film part comprises:

a release film configured to protect a lower adhesive surface of the liquid crystal protection film part; and a release layer formed above the release film so that the release film is attachable to or detachable from the lower portion of the liquid crystal protection film part.

7. The liquid crystal protection film of claim 1, wherein the liquid crystal protection film is curved and pressurized to correspond to a shape of the liquid crystal, and a curved portion thereof has a curvature, so that the curved portion is three-dimensionally formed to prevent a springback phenomenon and prevent occurrence of thermal wrinkles or molding damage.

* * * * *